(12) United States Patent
Chiang

(10) Patent No.: US 7,342,430 B1  
(45) Date of Patent: Mar. 11, 2008

(54) WRITE STRATEGY WITH MULTI-STAGE DELAY CELL FOR PROVIDING STABLE DELAYS ON EFM CLOCK

(76) Inventor: Kevin Chiang, 40734 Ambar Pl., Fremont, CA (US) 94539

( * ) Notice: Subject to any disclaimer, the term of this patent is extended or adjusted under 35 U.S.C. 154(b) by 0 days.

(21) Appl. No.: 11/238,737

(22) Filed: Sep. 29, 2005

Related U.S. Application Data

(60) Provisional application No. 60/616,295, filed on Oct. 5, 2004.

(51) Int. Cl.  
*G06F 1/04* (2006.01)

(52) U.S. Cl. .................. 327/295; 327/327; 327/291

(58) Field of Classification Search ............... None  
See application file for complete search history.

(56) References Cited

U.S. PATENT DOCUMENTS

| | | | | |
|---|---|---|---|---|
| 5,561,692 A | * | 10/1996 | Maitland et al. | 375/371 |
| 6,031,401 A | * | 2/2000 | Dasgupta | 327/116 |
| 6,775,217 B1 | | 8/2004 | Kato | |
| 6,876,186 B1 | * | 4/2005 | Gupta | 324/76.54 |
| 6,950,956 B2 | * | 9/2005 | Zerbe et al. | 713/400 |
| 7,010,014 B1 | * | 3/2006 | Percey et al. | 375/130 |

* cited by examiner

*Primary Examiner*—Cassandra Cox

(57) ABSTRACT

Present invention provides a method and apparatus for generating multiple phase shifted clocks with clocks delayed from EFM clock.

2 Claims, 5 Drawing Sheets

FIG 3 Delay Chain

WRITE STRATEGY WITH MULTI-STAGE DELAY CELL FOR PROVIDING STABLE DELAYS ON EFM CLOCK

CROSS-REFERENCE TO RELATED APPLICATIONS

This application claims the benefit of provisional patent application No. 60/616,295 filed 2004 Oct. 5 by the present inventor.

BACKGROUND OF THE INVENTION

1. Field of the Invention

The present invention provides a method and apparatus for generating multiple phase shifted clocks using a series of delayed clocks. A phase shifted clock can be used to generate a DVD write power control waveform with high precision.

In writing data to a DVD (Digital Video Disk) disc, a number of series of pulses may be required in order to accurately write data to the disc. T is 1 full EFM (eight-to-fourteen Modulation) clock cycle. Very fine resolutions of ⅛T, ¹/₁₆T, ¹/₃₂T are needed to generate proper power control waveform.

Prior art U.S. Pat. No. 6,775,217 uses analog ring oscillator FIG. 1 to generate an eight phase clock at 4× EFM clock. This prior art needs an analog design, which requires a large circuit size, and is limited in speed.

It is therefore an object of the invention to use digital delay cells to generate multiple phase shifted clocks.

It is another object of the invention to use digital delay to generate multiple phase shifted clocks using only 1× EFM clock to avoid the need for high speed processing.

It is another object of the invention to allow the use of smaller die sizes by using digital design.

It is another object of the invention to consume less power by avoiding use of analog design.

SUMMARY OF THE INVENTION

Present invention provides a method and apparatus for generating multiple phase shifted clocks with clocks delayed from EFM clock.

DRAWINGS—Reference Numerals

| 30 | D | 200 | clk |
|---|---|---|---|
| 201 | clk_s[16] | 210 | DelayChain |
| 220 | MUXS | 230 | Inverter |
| 240 | clk_d[n:1] | 250 | clk_s[15:1] |
| 260 | clk_s[31:17] | 270 | clk_s16_d[n:1] |
| 280 | clk_s[31:1] | 285 | DFFS |
| 290 | S | 295 | T[31:1] |

-continued

| 311 | clk_d[1] | 312 | clk_d[2] |
|---|---|---|---|
| 313 | clk_d[3] | 314 | clk_d[4] |
| 317 | clk_d[n] | 400 | MUX |
| 410 | clk_d[m] | 411 | clk_d[2m] |
| 412 | clk_d[3m] | 413 | clk_d[4m] |
| 414 | clk_d[mn] | 415 | clk_sm |
| 420 | clk_s16_d[m] | 421 | clk_s16_d[2m] |
| 422 | clk_s16_d[3m] | 423 | clk_s16_d[4m] |
| 424 | clk_s16_d[mn] | 425 | clk_s(m + 16) |
| 501 | clk_s[1] | 502 | clk_s[2] |
| 503 | clk_s[[3] | 504 | T[15] |
| 505 | T[17] | 517 | clk_s[17] |

DESCRIPTION OF THE PREFERRED EMBODIMENT

Figure 1:
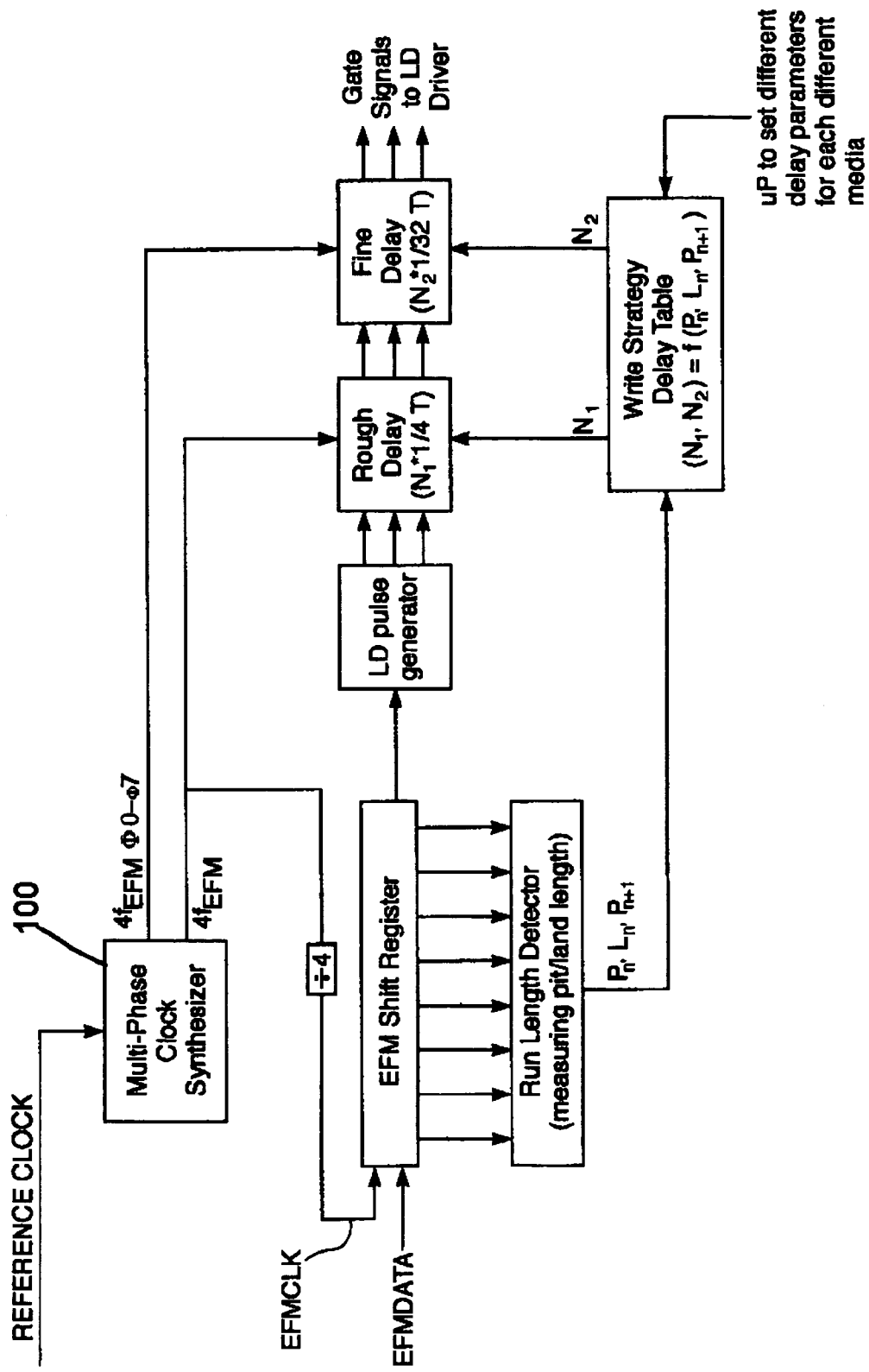
FIG. 1 is a prior art multiple phase clock synthesizer 100 used to generate 4× EFM clock and an 8 phase clock.
Figure 2:
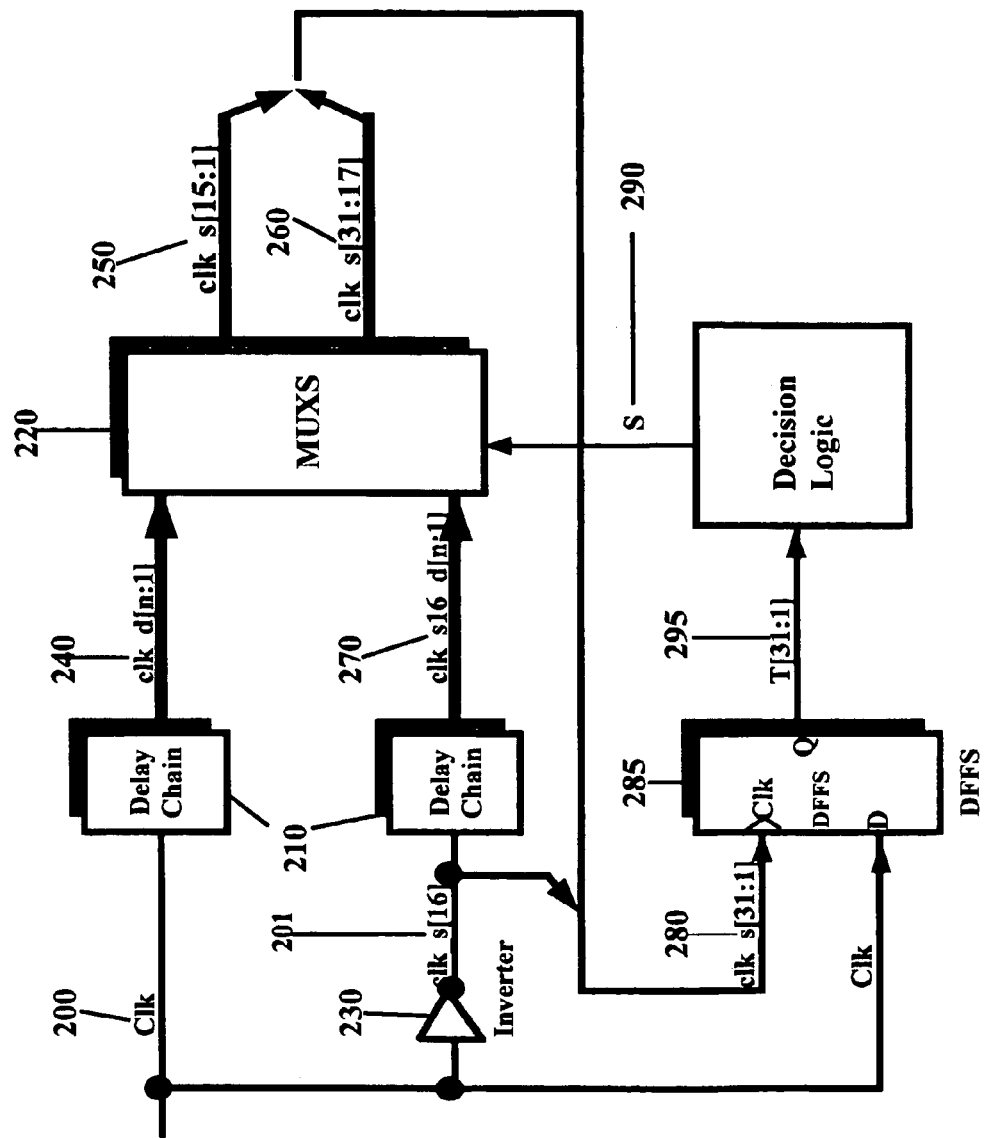
FIG. 2 is a block diagram showing a circuit for generating multiple-phase shifted clocks.

FIG. 2 is a block diagram showing the generation of multiple phase shifted clocks. Delay Chain 210 are the circuits used to provide different delay times from EFM clock clk 200. clk_d[n:1] 240 is the array of delayed clocks generated by Delay Chain 210, with clocks ranging from a delay of 1 unit time to n unit time from EFM clock clk 200. clk_s[16] 201 is output from inverter 230, an inverted copy of EFM clock clk 200. clk_s16_d[n:1] 270 is the array of delayed clocks generated by Delay Chain 210 with input clk_s [16] 201. MUXS 220 is the collection of thirty MUX 400 (multiplexer) used to select from delay shifted clock to create phase shifted clock clk_s[15:1] 250 and clk_s[31:17] 260. clk_s[15:1] 250 is the array of EFM clock phase shifted ¹/₃₂T to ¹⁵/₃₂T, which is sourced from clk_d[n:1] 240 and selected by S 290. clk_s[31:17] 260 are the phase shifted ¹⁷/₃₂T to ³¹/₃₂T clock and sourced from Clk_s16_d[n:1] 270 and selected by selection signal S 290. Clk_s[31:1] 280 is combined from clk_s[31:17] 260 and clk_s[15:1] 250. DFF 285 (D-type flip flop) uses clk_s[31:1] 280 rising edge to latch EFM clock clk 200, and T[31:1] 295 are the output of DFF 285. T[31:1] 295 is then used to determine the selection signal S 290.

Figure 3:
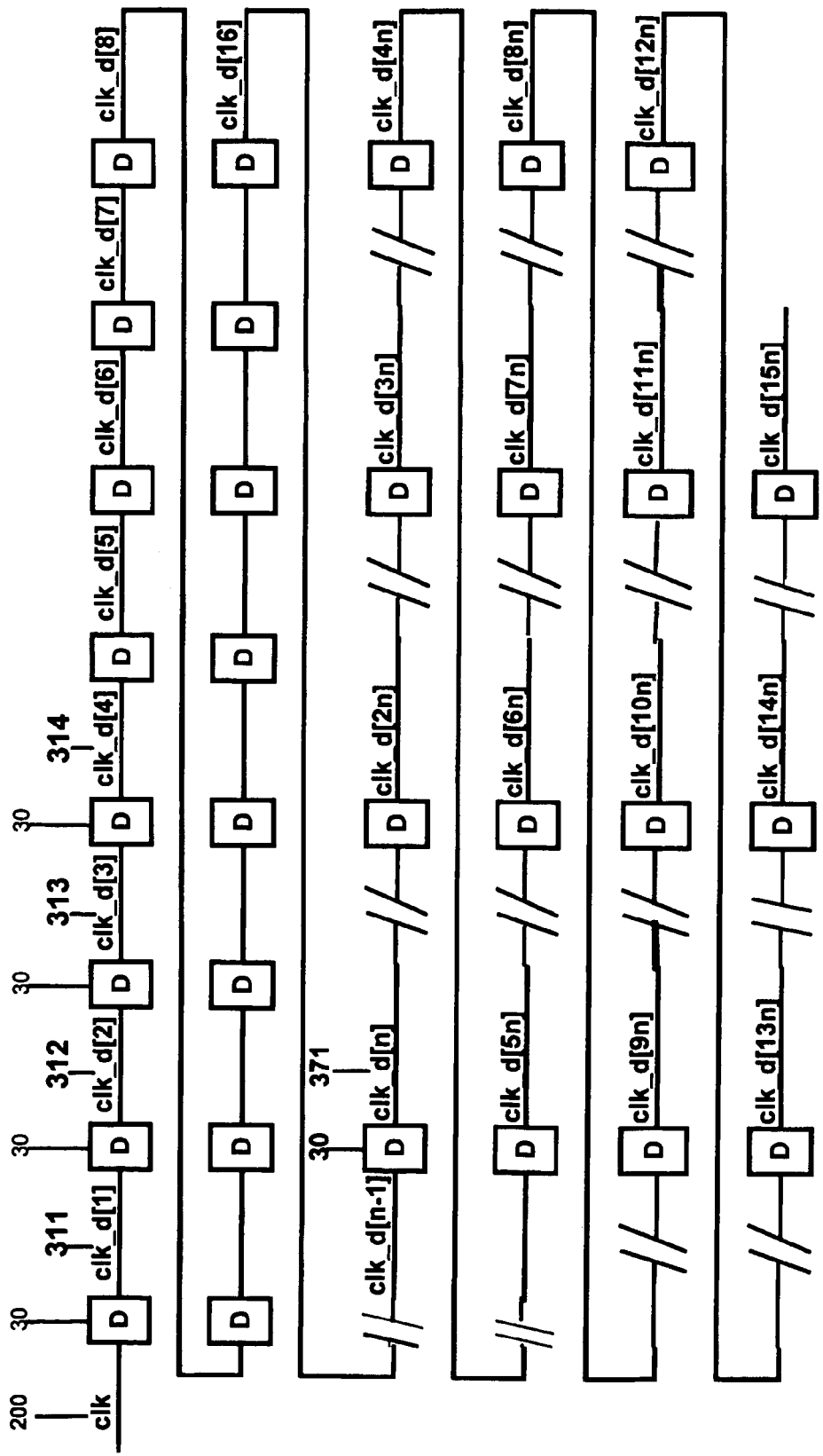
FIG. 3 is a block diagram of delay chain.

FIG. 3 is a circuit using unit delay cell D 30 to generate multiple delay clocks, by cascading multiple delay cell D 30. clk_d[1] 311 is delayed one unit time from EFM clock clk 200; clk_d[2] 312 is delayed one unit time from clk_d[1] 311, and is delayed two unit time from EFM clock clk 200; clk_d[3] 315 is delayed three unit time clock from EFM clock clk 200; clk_d[4] 314 is delayed four unit time from EFM clock clk 200. In general, clk_d[n] 371 is delayed n unit time from EFM clock clk 200.

Figure 4:
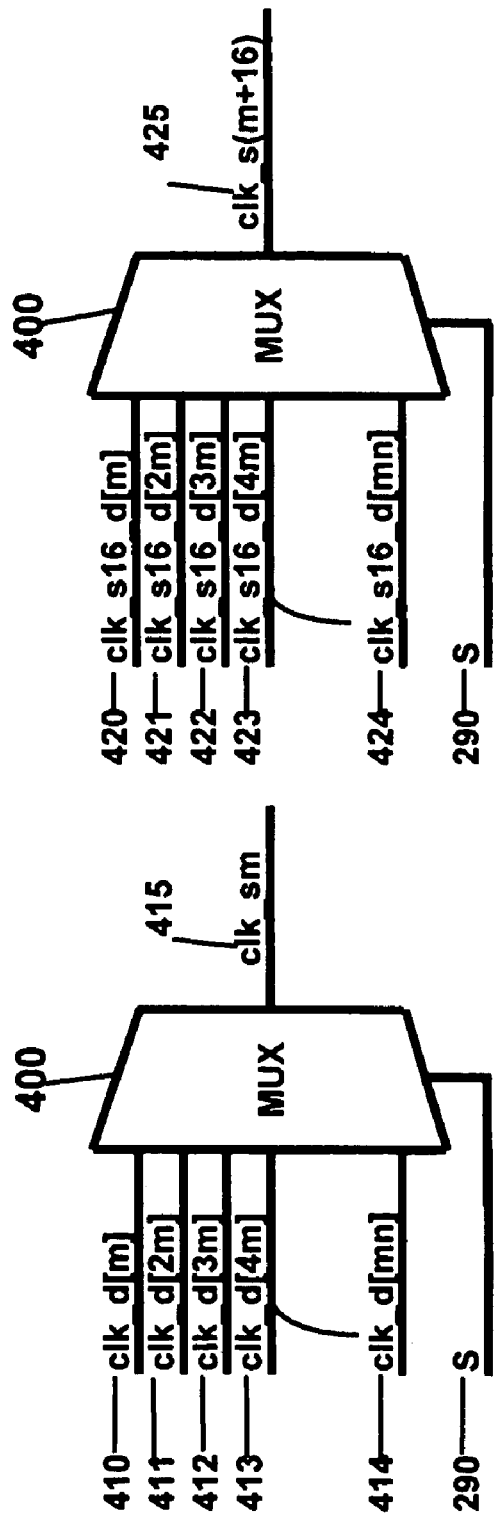
FIG. 4 is a MUX (multiplexer) for selecting phase shifted clocks.

FIG. 4 is a circuit using MUX 400 to output multiple delayed phase clocks: clk_sm 415, with m from 1 to 15. clk_sm 415 are selected from clk_d[m] 410, clk_d[2m] 411, clk_d[3m] 412, clk_d[4m] 413, . . . , and clk_d[mn] 414. The output is selected by S 290. n is the maximum number of phase shifted ¹/₃₂T clock output by delay chains. clk_s(m+ 16) 425 are the phase shifted clocks from ¹⁷/₃₂T to ³¹/₃₂T clock, and selected from clk_s16_d[m] 420, clk_s16_d[2m] 421, clk_s16_d[3m] 422, clk_s16_d[4m] 423, . . . , and clk_s16_d[mn] 424, also selected by selection signal S 290.

Figure 5:
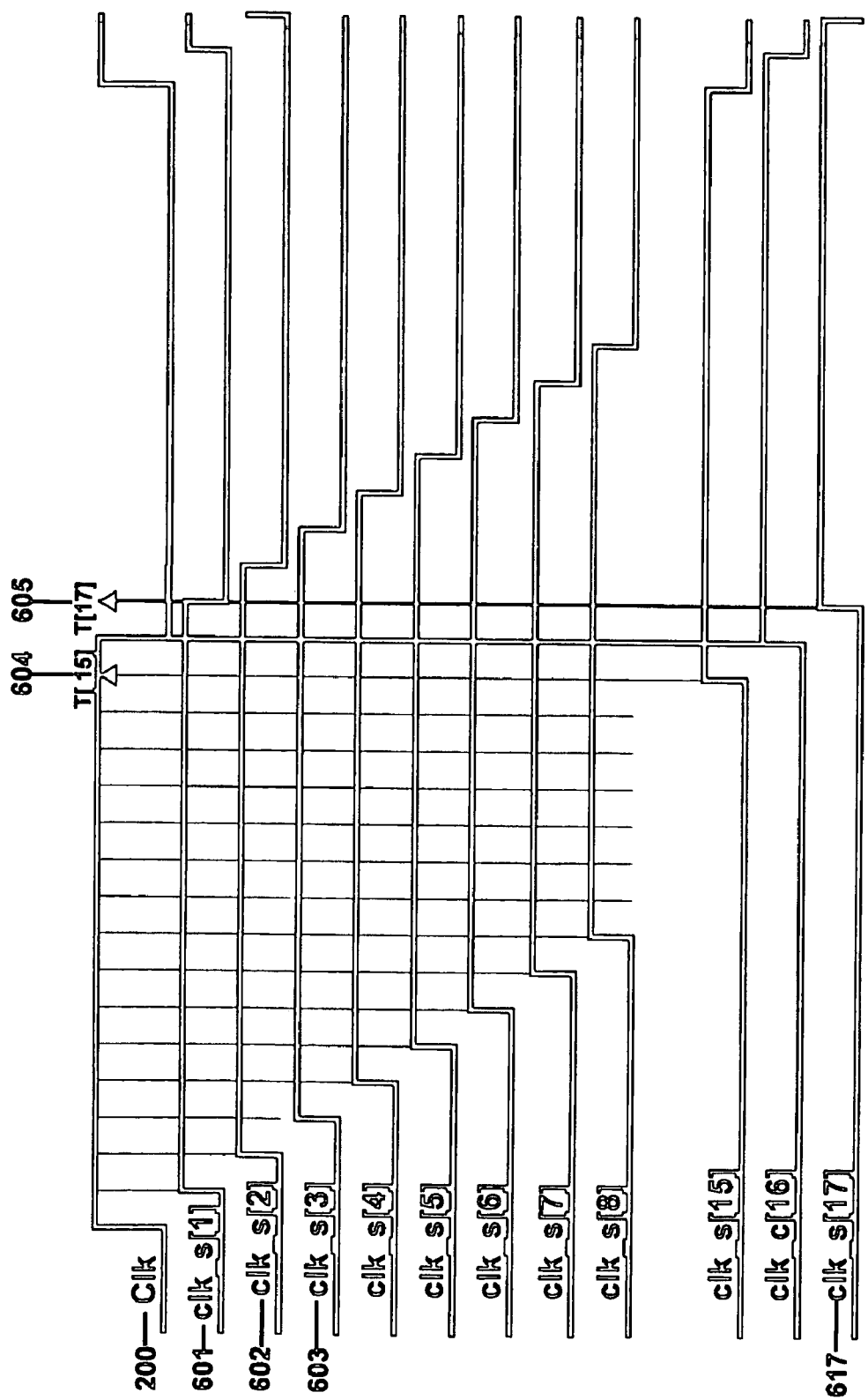
FIG. 5 is a waveform of shift clocks and clk.

FIG. 5 show the waveforms for EFM clock clk 200, and phase shifted clocks clk_s[1] 501, clk_s[2] 502, clk_s[3] 503, to clk_s[17] 517. The decision logic generates the selection signal S 290 needed to make T[15] 504 have the value 1, and T[17] 505 to have the value 0.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A apparatus for generating multiple phase shifted clocks comprising:
   multiple delay chains, receiving a reference clock signal and outputting multiple delayed clocks;
   and a collection of multiple multiplexers (MUXS), each used to generate multiple phase shifted clocks from the multiple delayed clocks, with the proper phase shift selected by a selection signal;
   and collection of multiple latches, each separately latching a reference clock signal based on a phase-shifted clock received from the multiplexer, and outputting phase information;
   and a decision logic, outputting the signal selection signal based on phase information received from the collection of latches.

2. A method for generating multiple phase shifted clocks comprising the steps of:
   outputting, with multiple delay chains, multiple delayed clocks by delaying a received reference clock with different numbers of delay time units,
   generating, using multiple multiplexers, multiple phase shifted clocks by selecting from multiple delayed clocks in response to a selection signal,
   latching the reference clock signal with multiple latches, each clocked by a phase shifted clock signal,
   outputting, with latched data, an array of phase information,
   deciding, with decision logic, the selection signal based on phase information.

* * * * *